US005953483A

United States Patent [19]
Van Gestel et al.

[11] Patent Number: 5,953,483
[45] Date of Patent: Sep. 14, 1999

[54] APPARATUS FOR RECORDING AND REPRODUCING AN INFORMATION SIGNAL COMPRISING PACKETS THAT MAY OCCUR IRREGULARLY AS A FUNCTION OF TIME IN A SERIAL DATASTREAM OF THE INFORMATION SIGNAL, AND A RECORD CARRIER CARRYING THE INFORMATION SIGNAL

[75] Inventors: Wilhelmus J. Van Gestel, Eindhoven, Netherlands; Ronald W. J. J. Saeijs, Nürnberg, Germany; Fre J. Jorritsma; Onno Eerenberg, both of Eindhoven, Netherlands

[73] Assignee: U.S. Philips Corporation, New York, N.Y.

[21] Appl. No.: 08/622,508

[22] Filed: Mar. 25, 1996

[30] Foreign Application Priority Data

Mar. 28, 1995 [EP] European Pat. Off. ............. 95200779

[51] Int. Cl.$^6$ ..................................................... H04N 5/92
[52] U.S. Cl. ............................... 386/65; 386/95; 386/112
[58] Field of Search ..................................... 386/111, 109, 386/112, 124, 104, 65, 46, 98, 95, 66, 48; 360/48; 348/423; H04N 5/92, 5/93

[56] References Cited

U.S. PATENT DOCUMENTS

| 5,481,543 | 1/1996 | Velman ................................... 348/423 |
| 5,579,183 | 11/1996 | Van Gestel et al. ...................... 360/48 |
| 5,596,581 | 1/1997 | Saeiji et al. .............................. 386/104 |
| 5,619,337 | 4/1997 | Naimpally ............................... 386/124 |

FOREIGN PATENT DOCUMENTS

| 9601540 | 1/1996 | WIPO .............................. H04N 7/58 |
| 9602098 | 1/1996 | WIPO ............................. H04L 12/36 |

OTHER PUBLICATIONS

Research Disclosure, Oct. 1994, p. 581.
ISO/IEC 13818–1 International Standard, Part 1 "Systems", dated Nov. 13, 1994.

Primary Examiner—Huy Nguyen
Attorney, Agent, or Firm—Edward W. Goodman

[57] ABSTRACT

A recording apparatus, for recording an information signal in at least one track on a record carrier. The information signal comprises packets ($P_i$) that may occur irregularly as a function of time in the serial datastream of the information signal. The apparatus comprises an input terminal for receiving the information signal, a channel encoding unit for channel encoding the information signal into a channel encoded information signal and a writing unit for writing the channel encoded information signal in said at least one track on the record carrier. The channel encoded information signal comprises frames of information. A frame of information may be recorded in a group of n subsequent tracks (Tr0 to Tr11), when the recording apparatus is a recording apparatus of the helical scan type, where n is an integer larger than 1. The apparatus further comprises a time stamp generator unit for generating time stamps ($TS_i$) having a relation to the moment of occurrence of a packet comprised in the information signal received. Further, a combining unit is present for combining a packet and its corresponding time stamp so as to obtain a composite packet ($P_i'$). The time stamp generator unit comprises a counter for generating subsequent cycles of subsequent count values, said cycles coinciding in time with the recording of subsequent frames in said at least one track on the record carrier. In response to the detection of the occurrence of a packet in said information signal, a time stamp for said packet is generated, which time stamp has a specified relationship to the count value of said counter means at said moment of occurrence of said packet.

29 Claims, 10 Drawing Sheets

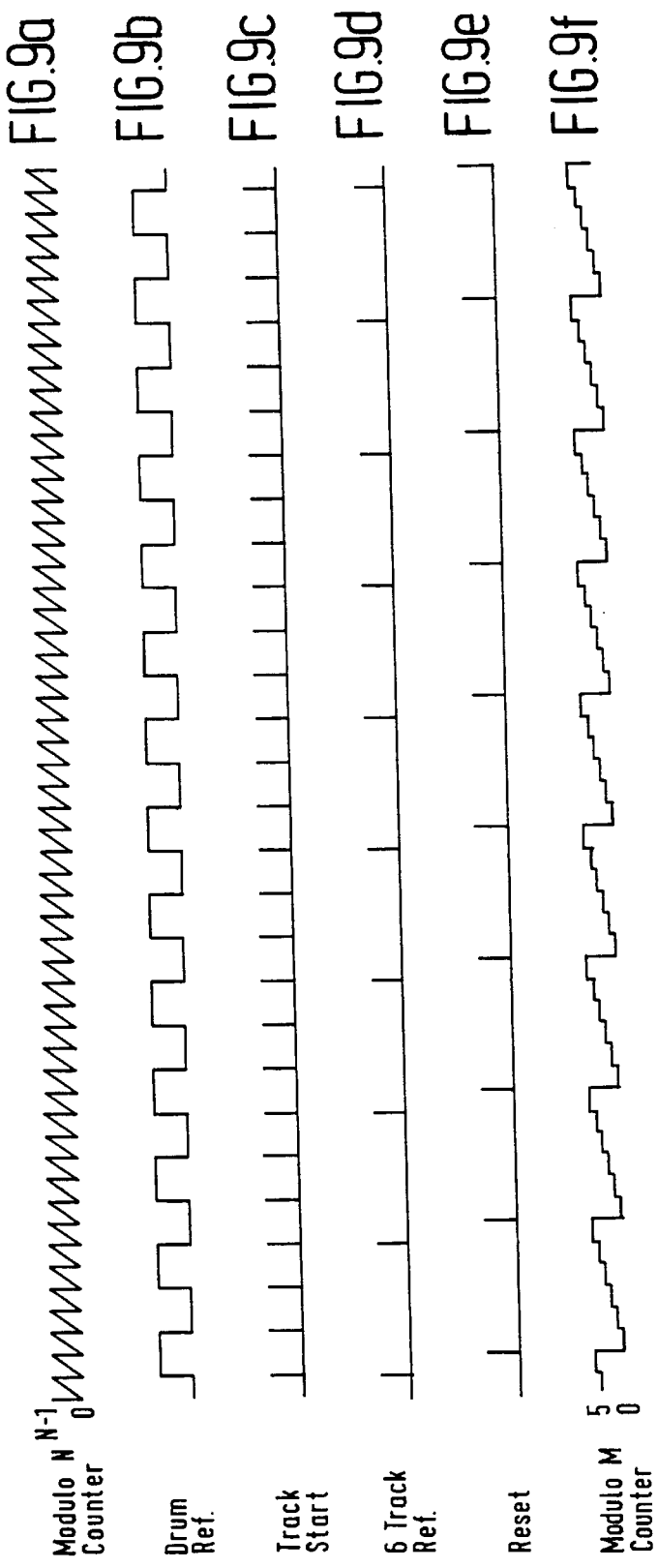

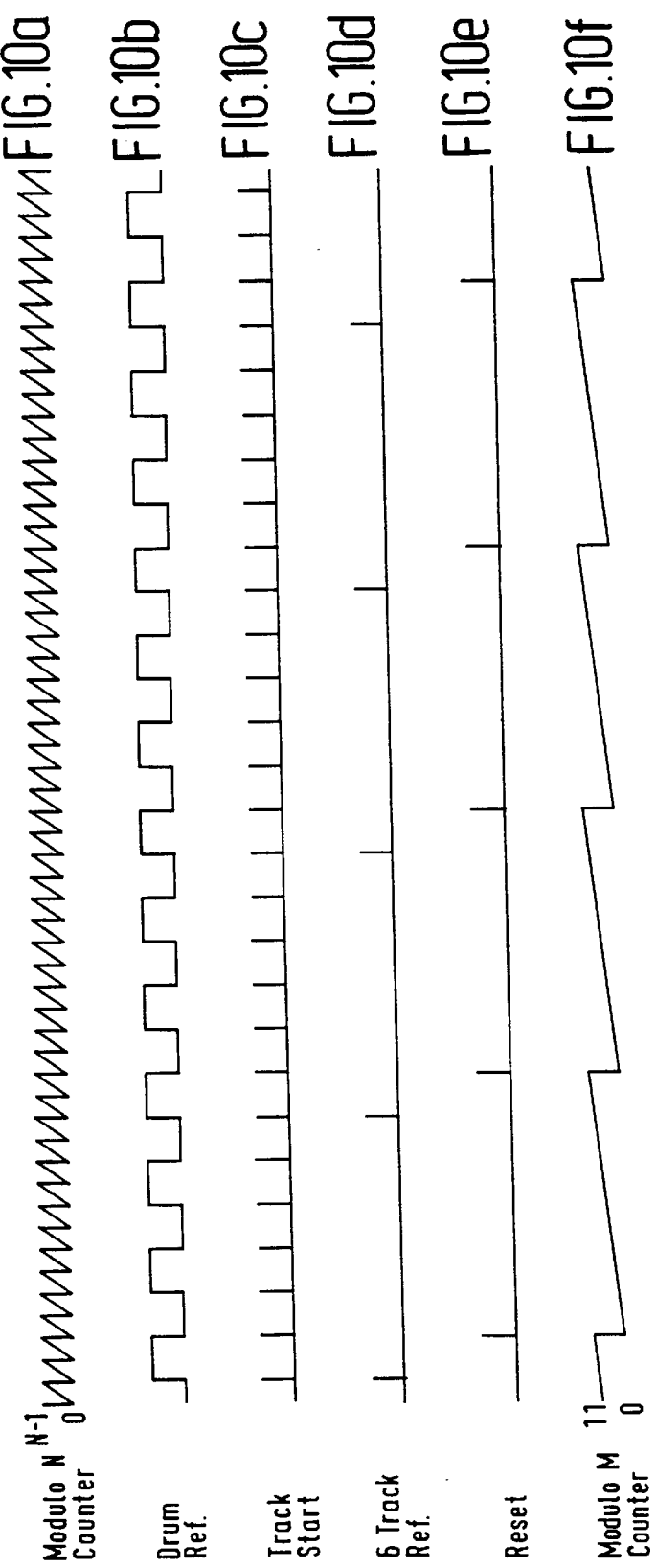

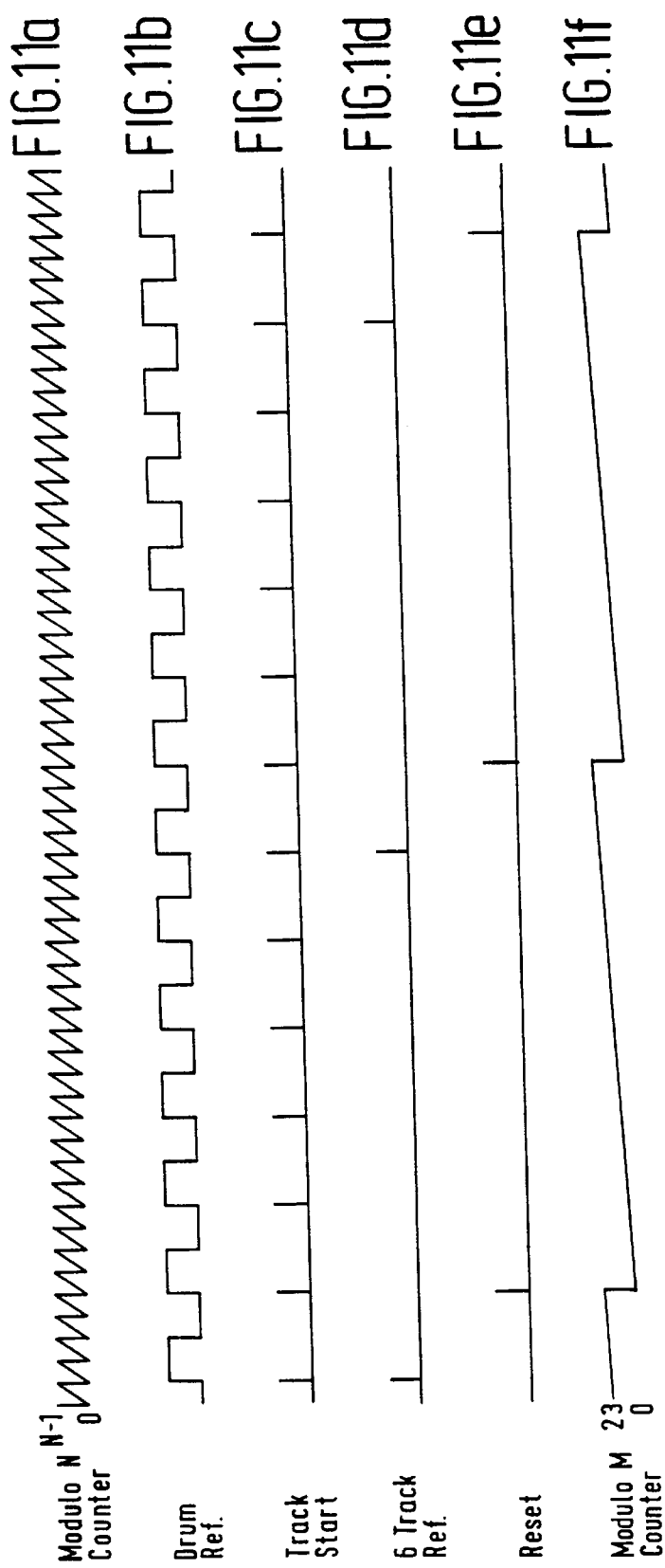

APPARATUS FOR RECORDING AND REPRODUCING AN INFORMATION SIGNAL COMPRISING PACKETS THAT MAY OCCUR IRREGULARLY AS A FUNCTION OF TIME IN A SERIAL DATASTREAM OF THE INFORMATION SIGNAL, AND A RECORD CARRIER CARRYING THE INFORMATION SIGNAL

BACKGROUND OF THE INVENTION

1. Field of The Invention

The invention relates to a recording apparatus for recording an information signal in at least one track on a record carrier, the information signal comprising packets that may occur irregularly as a function of time in the serial datastream of the information signal.

2. Description of The Related Art

The recording of an MPEG encoded information signal on a record carrier, such as a magnetic record carrier, is known from Research Disclosure, October 1994, p. 581, Publication No. 36629. Although the publication discusses the recording of feature mode information on the record carrier, more specifically, by means of a recording apparatus of the helical scan type, it should be noted that the present invention is not restricted to that. The information to be recorded can thus relate to the information that can be reproduced at a nominal transport velocity of the record carrier during reproduction.

The MPEG encoded information signal comprises transport packets that may occur irregularly in the serial datastream of the MPEG transport stream.

The ISO/IEC 13.818 International Standard, Part 1 'Systems', dated 13 Nov. 1994, contains a description of a transport system for transmitting an MPEG information signal, which may include a data-compressed digital video signal and a corresponding data-compressed digital audio signal, for broadcasting purposes or for transmission via a cable network. The MPEG information signal is in the form of transport packets comprising 188 bytes of information each.

Packets in the MPEG serial data stream comprise, apart from 'system information', one kind of information, that is: either a portion of a video signal, or a portion of an audio signal, or a portion of a data signal. A plurality of video signals and/or a plurality of audio signals and/or a plurality of data signals may be transmitted via the transport packets in the MPEG serial data stream. A packet also comprises information of only one of the video signals, or one of the audio signals, or one of the data signals transmitted via the MPEG serial data stream.

A transmission of such MPEG information signal in the form of a recording on and a reproduction from a record carrier, requires special measures to be taken in order to realize such kind of transmission.

Earlier filed applications U.S. patent application Ser. No. 08/225,193, having a filing date of Apr. 8, 1994, now U.S. Pat. No. 5,579,183 (PHN 14.818), and U.S. patent application Ser. No. 08/253,535, having a filing date of Jun. 3, 1994, now U.S. Pat. No. 5,596,581 (PHA 21.886), describe various of such measures to realize a recording and reproduction of an MPEG information signal.

It can generally be said that the recording of a complete MPEG information signal is not well possible, because of the too high data rate of the MPEG information signal.

One of the video signals and its corresponding audio signal(s) included in the MPEG serial datastream are now selected for recording. As a consequence, generally, transport packets will be selected on an irregular basis as a function of time. In order to preserve the timing relation between the subsequent packets selected, after having recorded and reproduced the packets, the earlier filed documents describe the measure of inserting timing information (or a 'time stamp') in each of the packets recorded. Upon reproduction, the timing relation between the subsequent packets can be regained using the time stamps.

SUMMARY OF THE INVENTION

The subject invention aims at providing an embodiment of a recording apparatus for recording the packets using generated time stamps, and at providing a reproducing apparatus capable of regenerating the sequence of packets using the time stamps included in the packets.

The recording apparatus, for for recording an information signal in at least one track on a record carrier, the information signal comprising packets that may occur irregularly as a function of time in the serial datastream of the information signal, the apparatus comprising an input terminal for receiving the information signal; channel encoding means for channel encoding the information signal into a channel-encoded information signal; and writing means for writing the channel-encoded information signal in said at least one track on the record carrier, the channel-encoded information signal comprising frames of information being recorded in said at least one track, is characterized in that the apparatus further comprises time stamp generator means for generating time stamps having a relation to the moment of occurrence of a packet comprised in the information signal received; and combining means for combining a packet and its corresponding time stamp so as to obtain a composite packet; the time stamp generator means comprising counter means adapted to generate subsequent cycles of subsequent count values, said cycles coinciding in time with the recording of subsequent frames of information in the at least one track on the record carrier, the time stamp generator means being adapted to generate, in response to the detection of the occurrence of a packet in said information signal, a time stamp for said packet, said time stamp having a specified relationship to the count value of said counter means at said moment of occurrence of said packet.

The recording apparatus may be a recording apparatus of the linear recording type, for recording the information signal in one or more longitudinal tracks running in the longitudinal direction on the record carrier.

The recording apparatus may also be of the helical scan type. Such apparatus of the helical scan type, for recording an information signal in slant tracks on a record carrier, the information signal comprising packets that may occur irregularly as a function of time in the serial datastream of the information signal, the apparatus comprising:

an input terminal for receiving the information signal;

channel encoding means for channel encoding the information signal into a channel-encoded information signal; and writing means for writing the channel-encoded information signal in said tracks on the record carrier, the channel-encoded information signal comprising frames of information, a frame of information being recorded in a group of n subsequent tracks, where n is an integer larger than 1, is characterized in that the apparatus further comprises time stamp generator means for generating time stamps having a relation to the moment of occurrence of a packet comprised in the information signal received; and combining means for combining a packet and its corresponding time stamp so as to obtain a composite packet, the time stamp generator means comprising counter means adapted to generate subsequent cycles of subsequent count values, said cycles coinciding in time with the recording of subsequent groups of n subsequent tracks on the record carrier, the time stamp generator means being adapted to generate, in response to the detection of the occurrence of a packet in said information signal, a time stamp for said packet, said time stamp having a specified relationship to the count value of said counter means at said moment of occurrence of said packet.

The reproducing apparatus for reproducing an information signal that has been recorded in channel-encoded form in at least one track on a record carrier, the information signal comprising packets that may occur irregularly as a function of time in the serial datastream of the information signal, a frame of the channel-encoded information signal being recorded in said at least one track, the reproducing apparatus comprising:

reading means for reading the channel-encoded information signal from said at least one track;

channel decoding means for channel decoding the channel encoded information signal into a replica of the information signal; and an output terminal for supplying the replica of the information signal, is characterized in that the frames in the channel-encoded information signal reproduced from the record carrier comprise composite packets, said composite packets being the packets comprised in the information signal, time stamps having been added to the packets so as to obtain said composite packets, said time stamps having a relation to the moment of occurrence of a packet comprised in the information signal upon recording, the channel decoding means comprising:

time stamp retrieval means for retrieving the time stamp from a composite packet so as to obtain the packet and the time stamp corresponding to said packet;

counter means adapted to generate subsequent cycles of subsequent count values from a start value to a final value, said cycles coinciding in time with the reproduction of the frames from said at least one track; and output means for comparing for each packet its corresponding time stamp with the count value of the counter means and for supplying the packet to the output terminal at a time instant when the count value of the counter means and the time stamp have a specified relationship to each other.

The reproducing apparatus of the helical scan type, for reproducing an information signal that has been recorded in channel encoded form in slant tracks on a record carrier, the information signal comprising packets that may occur irregularly as a function of time in the serial datastream of the information signal, a frame of the channel-encoded information signal being recorded in a groups of n subsequent tracks, where n is an integer larger than 1, the reproducing apparatus comprising:

reading means for reading the channel-encoded information signal from the tracks;

channel decoding means for channel decoding the channel-encoded information signal into a replica of the information signal; and an output terminal for supplying the replica of the information signal, is characterized in that the frames in the channel-encoded information signal reproduced from the record carrier comprise composite packets, said composite packets being the packets comprised in the information signal, time stamps having been added to the packets so as to obtain said composite packets, said time stamps having a relation to the moment of occurrence of a packet comprised in the information signal upon recording, the channel decoding means comprising:

time stamp retrieval means for retrieving the time stamp from a composite packet so as to obtain the packet and the time stamp corresponding to said packet;

counter means adapted to generate subsequent cycles of subsequent count values from a start value to a final value, said cycles coinciding in time with the reproduction of subsequent groups of n subsequent tracks; and output means for comparing for each packet its corresponding time stamp with the count value of the counter means and for supplying the packet to the output terminal at a time instant when the count value of the counter means and the time stamp have a specified relationship to each other.

The invention is based on the recognition that a counter is used during recording, for generating cycles of subsequent count values from a start value to a final value, said cycles coinciding in time with the time interval required for recording of a frame of information. In the recording apparatus of the helical scan type, said cycles may coincide in time with the time interval required for recording the group of n tracks, in which a frame of the channel-encoded information signal is recorded. More specifically, one cycle of count values may coincide in time with the time interval required to record the n tracks, or two or more cycles may coincide in time with the time interval required to record the n tracks. Upon the time instant of occurrence of a packet, the count value of the counter at that time instant may be taken as the time stamp and added to the packet so as to obtain the composite packet. The composite packet is stored 'somewhere' in the frame. As result, the composite packet is recorded 'somewhere' in one of the n tracks of the group of n tracks in which the frame in question is recorded, assuming the recording apparatus being a recording apparatus of the helical scan type.

Upon reproduction, the composite packet can be retrieved from the frame and the time stamp can be retrieved from the composite packet. The reproducing apparatus also has a counter generating the same cycles of count values from the start value to the final value, these cycles being synchronized to the frames of information reproduced from the at least one track. At the instant when the count value of the counter equals the value of the time stamp corresponding to a packet, the packet will be supplied to the output terminal at that same instant. As a result, all packets arrive at their original time sequence at the output terminal.

More generally, it can be said that, during reproduction, the cycles may coincide with the time intervals in which a frame is reproduced from the at least one track. In this situation, an offset value may be added to the time stamps retrieved from the packets so as to enable a correct regeneration of the stream of packets in their original timing sequence. Another solution could be to delay the cycles of the count values of the counter in time so that in each case a packet having a time stamp corresponding to a specified count value is available before the counter reaches said count value.

In an equivalent way, upon recording, an offset value may be added to the count value, or the cycles of count values could be delayed in time, compared to the time intervals of recording a frame of information.

It should further be noted that the earlier filed European Patent Application EP 94.201.945.6, having a filing date of Jul. 5, 1994, corresponding to U.S. patent application Ser. No. 08/498,291, filed Jun. 30, 1995, now U.S. Pat. No. 5,689,507 (PHN 14.935), and European Patent Application EP 94.201.967.0, having a filing date of Jul. 7, 1994, corresponding to U.S. patent application Ser. No. 08/496,352, filed Jun. 29, 1995, now U.S. Pat. No. 5,633,871 (PHN 14.937), describe the transmission of packets via a signal bus.

BRIEF DESCRIPTION OF THE DRAWINGS

These and other aspects of the invention will be apparent from and further elucidated with reference to the embodiments shown in the drawings, in which:

FIGS. 9a–9f, 10a–10f and 11a–11f show various signal waveforms ocurring in the reproducing apparatus of FIG. 8, for various modes of operation, that is: a HD mode of operation, an SD mode of operation, and an SD/2 mode of operation.

DESCRIPTION OF THE PREFERRED EMBODIMENTS

Figure 1A:
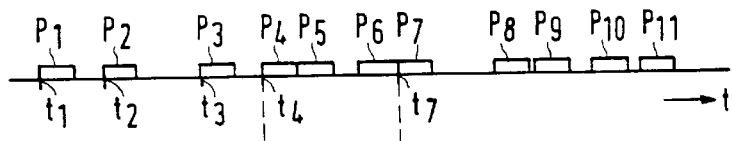
FIG. 1A shows the information signal to be recorded as a function of time, comprising packets that occur irregularly as a function of time.
Figure 1B:
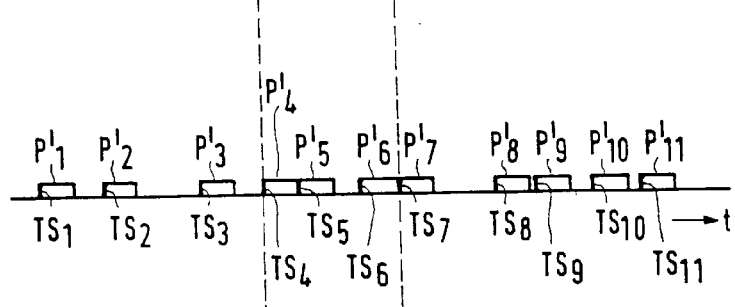
FIG. 1B shows the sequence of composite packets after a time stamp has been added to each of the packets.

FIG. 1A shows the information signal to be recorded. As has been said previously, the signal to be recorded may be one video signal that is included in the MPEG serial datastream, and its corresponding audio signal (s). The packets in the MPEG serial datastream comprising the information relating to the one video signal and the information relating to the corresponding audio signal(s) are selected from this serial datastream and become available as a function of time such as shown in FIG. 1A. The packets comprising the information signal to be recorded are indicated in FIG. 1A by the reference numerals $P_1$ to $P_{11}$. Time stamps $TS_1$ to $TS_{11}$ are added to the respective packets $P_1$ to $P_{11}$ so as to obtain composite packets $P_1'$ to $P_{11}'$, as shown in FIG. 1B. The time stamps in the composite packets are schematically indicated in FIG. 1B by the fat lines indicating the start portion of the composite packets. The time instants of occurrence of the packets are given by $t_1, t_2, t_3, t_4, \ldots$ in FIG. 1A.

Figure 1C:
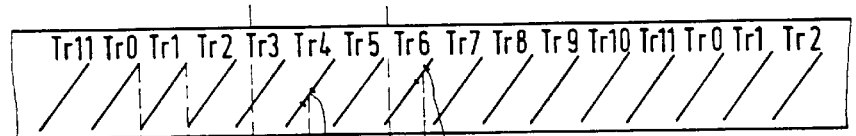
FIG. 1C shows a portion of the record carrier on which slant tracks are recorded.

FIG. 1C shows schematically the recording of the information in the slant tracks on the record carrier. The tracks on the record carrier are divided into subsequent groups of n tracks, where n equals 12 in the present example. FIG. 1C shows, from left to right, the last track Tr11 of a group of twelve tracks, then the twelve tracks Tr0 to Tr11 of the next group, followed by two tracks Tr0 and Tr1 of, again, a next group of twelve tracks. FIG. 1C is only a schematic figure, in that it shows the recording of the tracks as a function of time. When having two heads located at 180° around the circumference of a rotating drum, the first one of the two heads records information in a track, such as the track Tr0, starting at the time instant $t_b$ and ending at the time instant $t_c$. At that instant, the one head leaves the record carrier and the second head comes into contact with the record carrier for recording the track Tr1, starting at $t_c$ and ending at the time instant $t_d$. This sequence is repeated for each two tracks. A group of twelve tracks could thus have been recorded during six revolutions of the head drum.

It will be understood that other head drum constructions may be equally well possible. As an example, the head drum construction could comprise two head pairs located at 180° around the circumference of the head drum and the group of 12 tracks would have been obtained during three revolutions of the head drum, with a twice as high transport velocity of the record carrier, assuming all the other parameters are constant.

The composite packets are channel encoded and recorded in the tracks. As an example, the composite packet $P_4'$ could have been recorded in the portion indicated by $TP_4$ in track Tr4, and the composite packet $P_7'$ could have been recorded in the track portion $TP_7$ in track Tr6, see FIG. 1C.

Figure 1D:
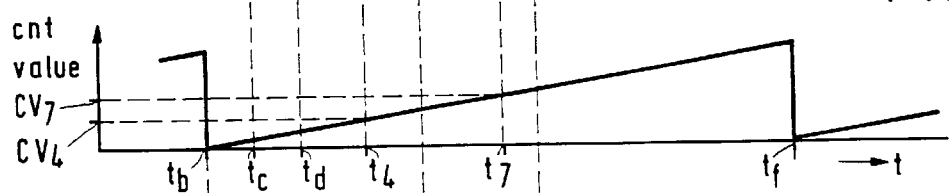
FIG. 1D shows cycles of count values of the counter as a function of time, during recording.

FIG. 1D shows the count value as a function of time of a counter which is capable of counting in subsequent count cycles from a start value, such as 'zero', to a final value. FIG. 1D shows the final portion of a count cycle which ends at the time instant $t_b$, a complete cycle between the time instants $t_b$ and $t_f$, and the start portion of a next cycle, beginning at the time instant $t_f$. At the time instants $t_b$ and $t_f$, the counter is resetted to its start value and counts within each cycle to its final value. A count cycle of the counter, defined by the time interval between the time instants $t_b$ and $t_f$, corresponds to precisely the time interval in which a group of n(=12) tracks is recorded on the record carrier. More specifically, the time instant of resetting the counter coincides with the time instant when the recording of the first track of each group of 12 tracks is started.

The generation of the time stamps will now be explained. Upon the occurrence of the packet $P_4$, as an example, at the time instant $t_4$, the counter has a count value $cv_4$, as shown in FIG. 1D. This count value $cv_4$ is now stored in the packet $P_4$ as the time stamp $TS_4$. The composite packet $P_4'$ is subsequently recorded in the track portion $TP_4$ in the track Tr4. Upon the occurrence of the packet $P_7$, as another example, at the time instant $t_7$, the counter has the count value $cv_7$, as shown in FIG. 1D. This count value is now stored as the time stamp $TS_7$ in the packet $P_7$ so as to obtain the composite packet $P_7'$. The composite packet $P_7'$ is subsequently recorded in the tack portion $TP_7$ in the track Tr6.

Figure 1E:
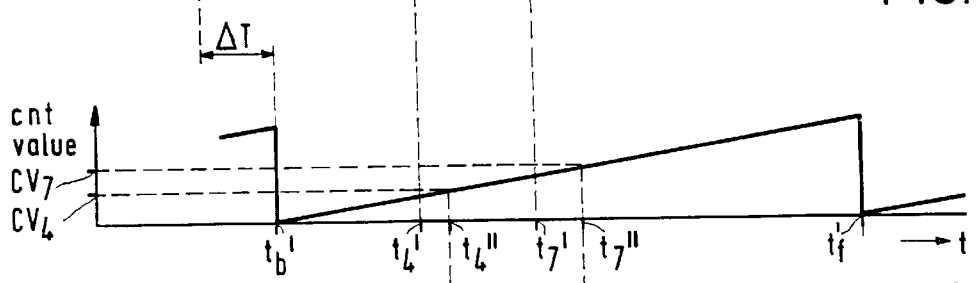
FIG. 1E shows cycles of count values of the counter as a function of time, during reproduction.

FIG. 1E shows the cycles of count values when reproducing the information recorded in the tracks shown in FIG. 1C. The cycles of count values in FIG. 1E are the same cycles as the cycles of count values generated during recording. As can be seen in FIG. 1E, the cycles are delayed over a time interval ΔT, compared to the cycles shown in FIG. 1D. This is done to enable the regeneration of the time sequence of the packets in the information signal after reproduction. This can be explained when describing the reproduction of the packets $P_4$ and $P_7$, that have been recorded in the tracks Tr4 and Tr6, respectively, in FIG. 1C.

Figure 1F:
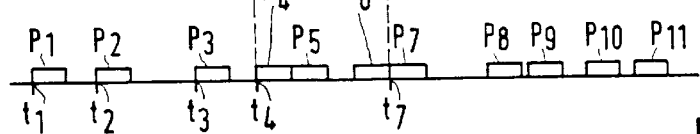
FIG. 1F shows the sequence of packets obtained during reproduction.

After having reproduced the composite packets $P_4'$ and $P_7'$ from the tracks, the time stamps $TS_4$ and $TS_7$ are retrieved from the composite packets. These time stamps equal the count values $cv_4$ and $cv_7$, respectively, as explained above with reference to FIG. 1D. At the time instant ($t_4'$ in FIG. 1E) of retrieval of the time stamp value $TS_4$ from the composite packet $P_4'$ reproduced from the track portion TP4, the counter has not yet reached the count value $cv_4$ (which occurs at the time instant $t_4''$, see FIG. 1E). When the count value of FIG. 1E reaches the value $cv_4$, the packet $P_4$ is supplied to an output, see FIG. 1F. In the same way, at the time instant ($t_7'$ in FIG. 1E) of retrieval of the time stamp value $TS_7$ from the composite packet $P_7'$ reproduced from the track portion TP7, the counter has not yet reached the count value $cv_7$ (which occurs at the time instant $t_7''$, see FIG. 1E). When the count value of FIG. 1E reaches the value $cv_7$, the packet $P_7$ is supplied to an output, see FIG. 1F. As a result, the information signal shown in FIG. 1F is regenerated.

As said earlier, the cycles in FIG. 1E could coincide with the reproduction of a frame as recorded on the record carrier, such as shown in FIG. 1D. Now, the composite packets $P_4'$ and $P_7'$ will be reproduced too late, in the sense that the count values $cv_4$ and $cv_7$, occurring at the time instants $t_4$ and $t_7$, respectively, see FIG. 1D, have already been passed before the packets are reproduced from the record carrier. This problem can be solved by retrieving the time stamps $TS_4$ and $TS_7$, respectively, from the composite packets and adding an offset value to the values of the time stamps. This offset value could be taken equal to the time delay ΔT, described above.

The allocation of the time stamps during recording could also have been done differently from the way described above, with reference to the FIGS. 1A, 1B and 1C. An offset value could already have been added to the count value of FIG. 1D, and the sum of the offset value and the count value could have been used as the time stamp for a packet. Or, the cycles shown in FIG. 1D could have been advanced by the time interval ΔT during the recording of the packets. In both situations, the count cycles shown in FIG. 1D could have been used during reproduction.

Figure 2:
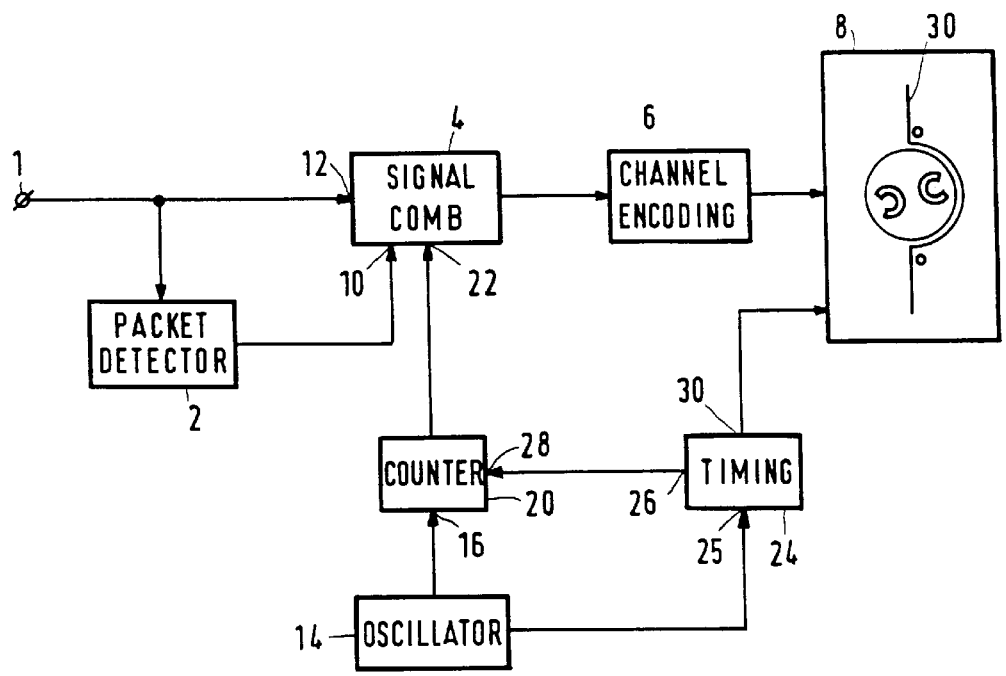
FIG. 2 shows an embodiment of the recording apparatus.

FIG. 2 shows an embodiment of the recording apparatus carrying out the recording method described above with reference to the FIGS. 1A to 1D. The recording apparatus has an input terminal 1 for receiving the packets shown in FIG. 1A. The input terminal 1 is coupled to an input of a packet detector 2 and an data input 12 of a signal combining unit 4. An output of the signal combining unit 4 is coupled to an input of a channel encoding unit 6, which has an output coupled to an input of a recording unit 8. An output of the packet detector 2 is coupled to a control input 10 of the signal combining unit 4. An oscillator 14 is present having an output coupled to a clock input 16 of a counter 20. The output of the counter is coupled to a second data input 22 of the signal combining unit 4. A central processing unit 24 is present for supplying the timing in the apparatus. The central processing unit 24 has an input 25 for receiving clock pulses from the oscillator 14 and an output 26 for supplying reset pulses to a reset input 28 of the counter 20. Further, the central processing unit 24 supplies timing pulses to the recording unit 8 via an output 30.

The oscillator 14 may have a clock frequency of 27 MHz, as an example. The counter thus counts up (or down) with this frequency and generates cycles of count values starting with a start count value, that may be 'zero', to a final value, after which a reset pulse supplied to the input 28 results in a resetting of the counter to its start value, so that a next cycle starts. Packets arrive at the input terminal 1, and the detector 2 detects the arrival of a packet, upon which the detector 2 generates a control signal and supplies this control signal to the control signal input 10 of the signal combining unit 4. The count value of the counter 20, at the time instant of occurrence of a packet, is stored in the packet detected by the detector 2, and supplied to the data input 12, upon the receipt of a control signal by the signal combining unit 4. The composite packet thus obtained is supplied to the channel encoding unit 6 for further processing, so that the channel-encoded composite packet can be recorded in the tracks on the record carrier 30.

The central processing unit 24 generates the timing pulses to the recording unit 8, so that it knows when a frame of information has been recorded in a group of n tracks and a next frame of information must be recorded in a subsequent group of n tracks.

It will be clear that enough count values are generated in a cycle in order to have a sufficient timing accuracy.

In 50 Hz systems, the counter may count in cycles from 0 (zero) to 1080000-1 (=27×10⁶/25) . In 59.94 Hz systems, the counter may count in cycles from 0 (zero) to 900900-1 (roughly 54×10⁶/59.94), and in 60 Hz systems the counter may count from 0 (zero) to 900000-1 (=27×10⁶/30).

Figure 3:
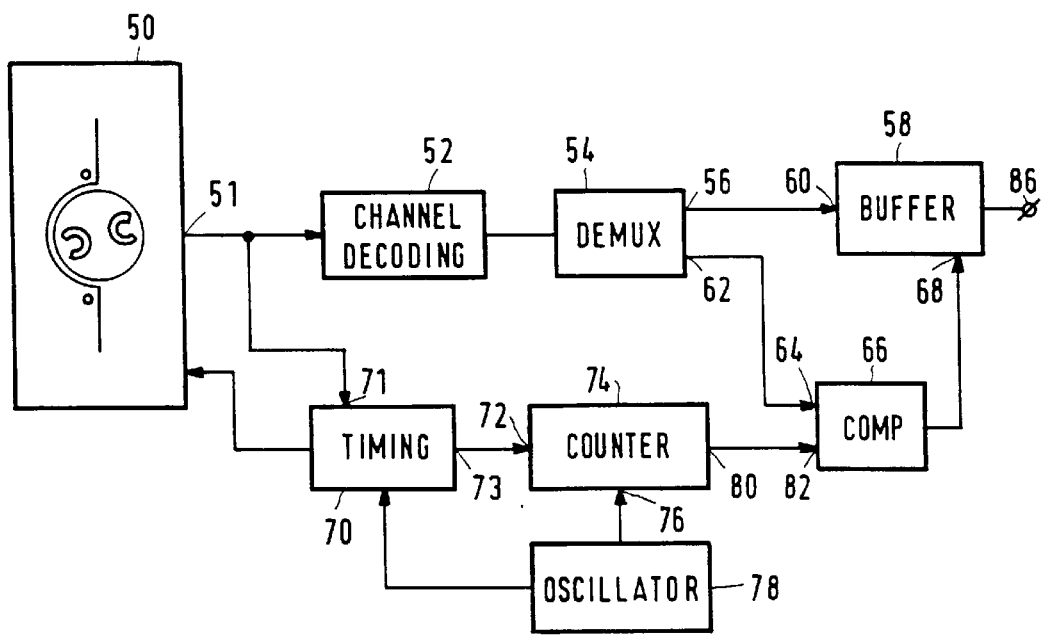
FIG. 3 shows an embodiment of the reproducing apparatus.

FIG. 3 shows an embodiment of a reproducing apparatus. A reproducing unit 50 is present having an output 51 coupled to an input of a channel decoding unit 52, which has an output coupled to an input of a demultiplexer 54. A first output 56 of the demultiplexer 54 is coupled to an input 60 of a buffer unit 58. A second output 62 of the demultiplexer is coupled to a first input 64 of a comparator 66, which has an output coupled to a control signal input 68 of the buffer unit 58. A central processing unit 70 for generating timing pulses is present, having an input 71 coupled to the output 51 of the reproducing unit 50, an output 73 coupled to a reset input 72 of a counter 74. The central processing unit 70 further receives clock pulses from an oscillator 78 and supplies timing pulses to the reproducing unit 50. A clock input 76 of the counter 74 is coupled to an output of the oscillator 78. An output 80 of the counter 74 is coupled to a second input 82 of the comparator 66.

The oscillator 78 will also have a clock frequency of 27 MHz, as an example, if the oscillator 14 in the recording apparatus has a clock frequency of 27 MHz. The counter 74 thus counts up (or down) with this frequency and generates cycles of count values starting with a start count value, that may be 'zero', to a final value, after which a reset pulse supplied to the input 72 results in a resetting of the counter to its start value, so that a next cycle starts. Frames, comprising channel-encoded composite packets, arrive at the input of the channel decoding unit 52 upon reproduction. The channel-encoded packets are channel decoded so as to obtain replicas of the composite packets. In the demultiplexer 54, the time stamps are retrieved from the replicas of the composite packets so as to obtain replicas of the packets. The time stamps are supplied to the output 62 and the replicas of the packets are supplied to the output 56. The replicas of the packets are supplied to the buffer memory 58 and stored therein. The time stamps are supplied to the input 64 of the comparator 66 and compared with the count values supplied to the input 82 by the counter 74.

The central processing unit 70 detects the occurrence of synchronization words that are present in each frame in the signal applied to its input 71. This detection may take place using a PLL. This offers the possibility to synchronize the cycles of count values generated by the counter 74 to the time intervals in which subsequent frames are reproduced.

The central processing unit 70 generates timing pulses for the counter 74. The timing pulses have thus a relation to the start of the reproduction of a frame of information that has been recorded in a group of n tracks. As a result, the cycles of count values generated by the counter 76 under the influence of the oscillator clock pulses and the timing pulses are in full synchronism with the cycles of the counter 20. As has been explained with reference to the FIGS. 9E and 1F, the cycles of count values may have a delay ΔT compared to the time intervals in which the frames are reproduced from the tracks.

A packet supplied by the demultiplexer 54 is stored in the buffer 58. The time stamp retrieved from said packet is supplied to the comparator 66 and compared to the sequence of count values supplied by the counter 74. As soon as a coincidence between the time stamp and the count value from the counter 74 is detected, the comparator 66 supplies a control signal at its output, this control signal being supplied to the control input 68 of the buffer 58. The buffer 58 supplies the packet stored in the buffer 58 to the output terminal 86 in response to the control signal supplied to the control input 68. A sequence of replicated packets appears at the output terminal 86, resulting in the signal shown in FIG. 1F.

It will be clear that, again, enough count values are generated in a cycle in order to have a sufficient timing accuracy.

In 50 Hz systems, the counter may count in cycles from 0 (zero) to 1080000-1. In 59.94 Hz systems, the counter may count in cycles from 0 (zero) to 900900-1, and in 60 Hz systems, the counter may count from 0 (zero) to 900000-1.

In another embodiment of the reproducing apparatus, the cycles of count values may coincide with the time intervals in which frames of information are reproduced from the record carrier. In such an embodiment, an adder unit (not shown) is inserted in the connection between the output 62 of the demultiplexer 54 and the input 64 of the comparator 66. The adder unit may be capable of adding the offset value, discussed earlier, to the time stamps supplied by the demultiplexer 54.

In the same way, the recording apparatus may be different, in that, as already explained above, an offset value could have been added to the count value of FIG. 1D, and the sum of the offset value and the count value could have been used as the time stamp for a packet. This requires an adder unit (not shown) in the connection between the output of the counter 20 in FIG. 2 and the input 22 of the combining unit 4. Or, the cycles shown in FIG. 1D could have been advanced by the time interval ΔT during the recording of the packets, which requires a different timing using the timing unit 24.

It should be noted that the invention is not restricted to the embodiments described. Various deviations from the embodiments described are possible without departing from the scope of the invention. The invention is thus equally well applicable in recording/reproducing apparatuses of the linear recording/reproducing type. Further, the recording/reproducing apparatus may be a recording/reproducing apparatus of the optical recording/reproducing type.

Figure 4:
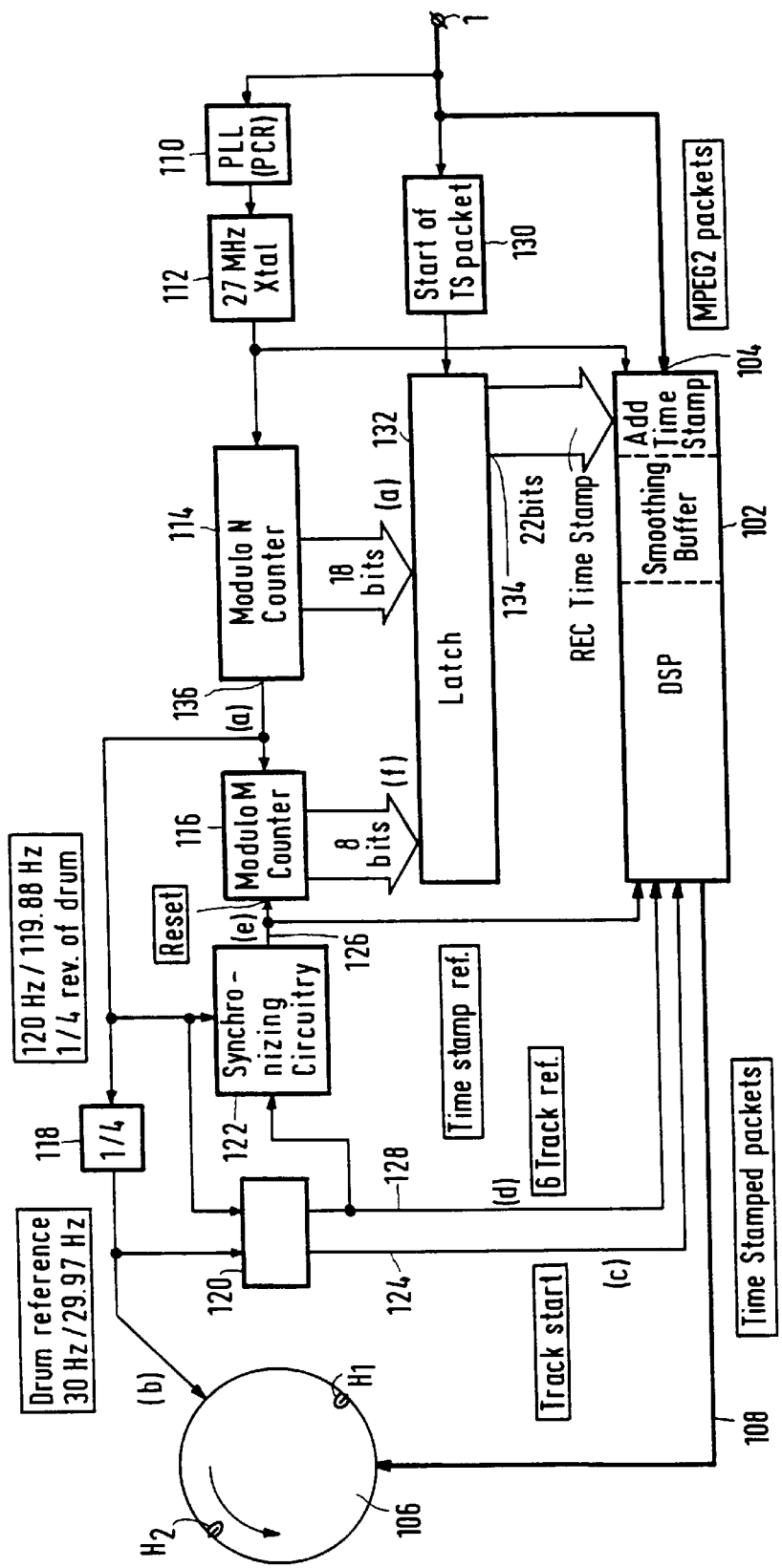
FIG. 4 shows a more elaborated embodiment of the recording apparatus.

FIG. 4 shows a more elaborated embodiment of the recording apparatus in accordance with the invention. The input terminal 1 is coupled to a signal input 104 of a signal processing unit 102. Packets of information of an MPEG encoded video signal, such as an MPEG-2 signal, received via the input terminal 1 are supplied to the input 104 of the processing unit 102, in which a time stamp is added to each packet. Signal processing is further carried out on the time-stamped packets, such as a channel encoding, buffering and smoothing in the processing unit 102. The processed signal, comprising the time-stamped packets, is supplied to a write head pair $H_1$ and to a write head pair $H_2$, located on the rotating head drum 106, via the signal lead 108. A phase-locked loop (PLL) 110 and an oscillator circuit 112 are present. The oscillator circuit 112 is adapted to supply a oscillation frequency of roughly 27 MHz. The purpose of the PLL 110 is to couple the recording oscillator in the oscillator circuit 112 to the timing of the incoming MPEG signal, which is also roughly 27 MHz. The PLL 110 locks onto the PCR clock information included in the MPEG packets and controls the clock frequency of the oscillator circuit 112, accordingly. The oscillator circuit 112 supplies a clock signal to a modulo-N counter 114. For a 625 lines/50 Hz system, N equals 225000 and the rotational velocity of the head drum 106 is 1800 rpm. For a 525 lines/60 Hz system, N equals 225225 and the rotational velocity is 1800/1.001 rpm. The counter 114 supplies 18 bits, in this example, for the count value of the time stamp. A modulo-M counter 116 is present which supplies 8 additional bits, in this example, for the count value of the time stamp. M can have various values, dependent on the mode of operation. As an example: in a HD (high definition) mode of operation (the recording bitrate is 28 Mb/s, 4 tracks are written per one revolution of the head drum and the tape velocity is $2.v_n$), M equals 6; in a SD (standard definition) mode of operation (14 Mb/s, 2 tracks are written per one revolution of the head drum and the tape velocity is $v_n$), M equals 12; in a SD/2 mode of operation (7 Mb/s, two tracks are written per two revolutions of the drum and the tape velocity is $v_n/2$), M equals 24; in a SD/7 mode of operation (2 Mb/s, 2 tracks are written in 7 revolutions of the drum and the tape velocity is $v_n/7$), M equals 84.

Time stamps of 22-bit binary words long are generated by the counters 114 and 116, which are available at the output 134 of a latch circuit 132. A divide-by-4 frequency divider 118 is present so as to obtain a drum reference clock signal to control the rotational velocity of the head drum 106. For N=225000, the rotational velocity is 30 Hz (or 1800 rpm, as explained above). For N=225225, the rotational velocity is 29.97 Hz (or 1800/1.001 rpm, as explained above).

Some additional circuitry is present, given by the blocks 120 and 122 for generating a track start signal, present on the line 124, a reset signal on the line 126 and a 6-track reference signal on the line 128. Further, a packet arrival detector 130 is present.

Figure 5:
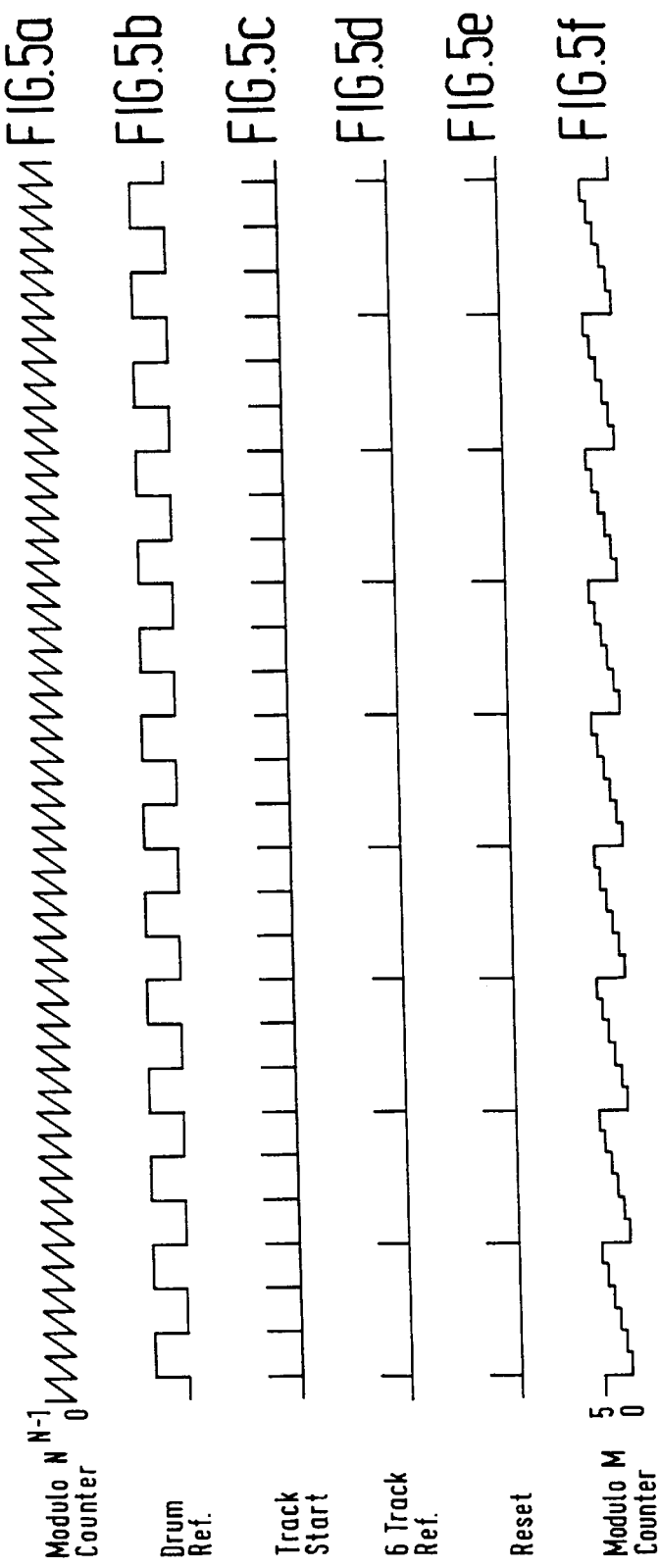
FIGS. 5a–5f, 6a–6f and 7a–7f show various signal waveforms occurring in the recording apparatus of FIG. 4, for various modes of operation, that is: a HD mode of operation, an SD mode of operation, and an SD/2 mode of operation.
Figure 6:
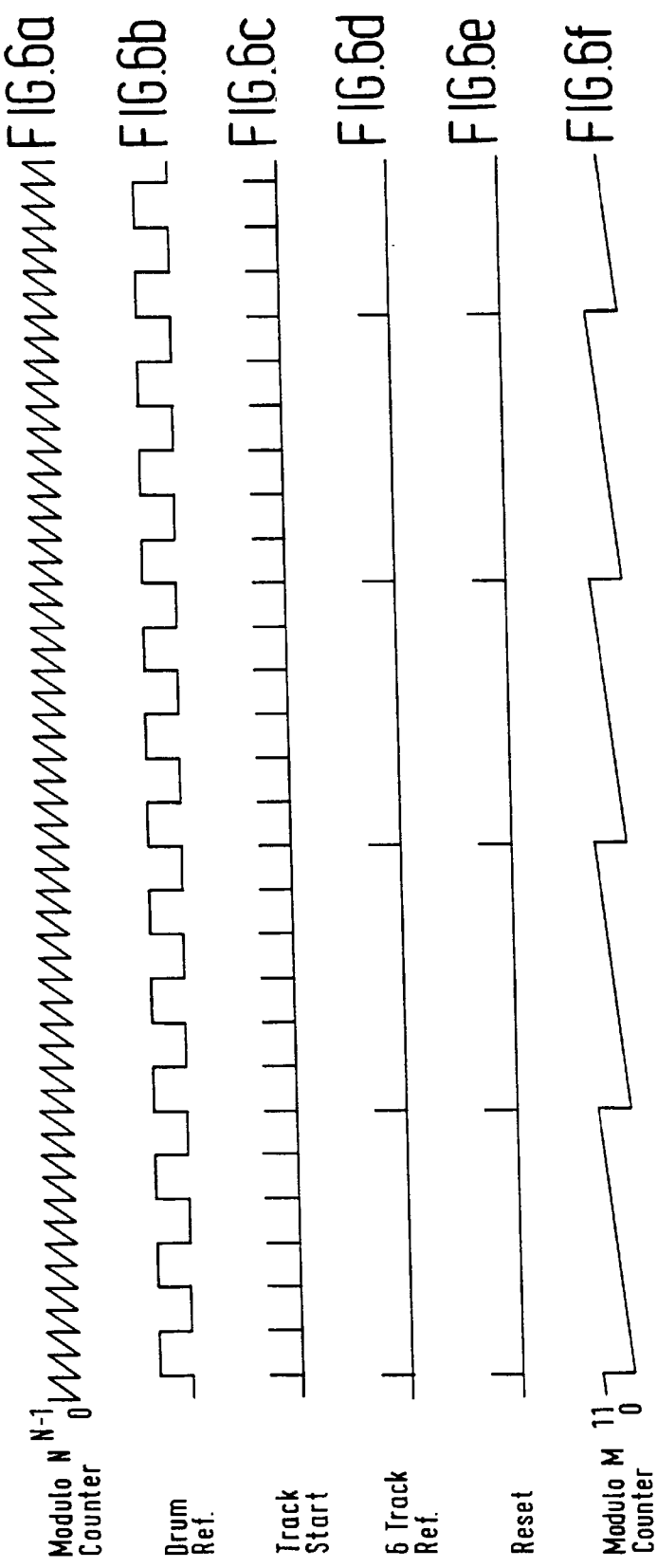
Figure 7:
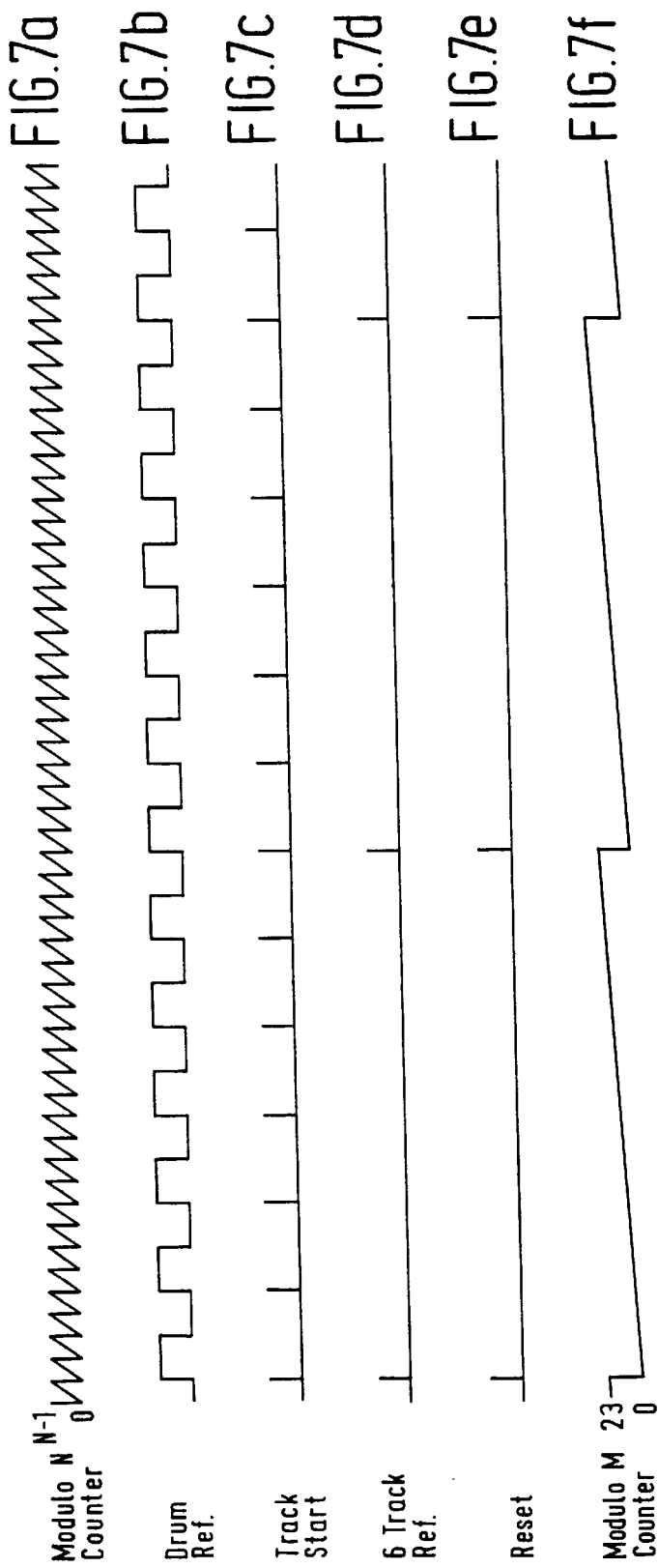

Various signals present in the apparatus of FIG. 4 are given in FIGS. 5a–5f. FIGS. 5a–5f show signals present in the apparatus, if the apparatus is in the HD mode of operation. The signal in FIG. 5a is the signal present at the output 136 of the counter 114, which is also the count signal which is supplied to the latch circuit 114. The signal in FIG. 5b is the signal present at the output of the divider 118. The signal in FIG. 5c is the signal present on the line 124 of the circuit 120. The signal in FIG. 5d is the signal present on the line 128 of the circuit 120. The signal in FIG. 5e is the signal present on the output line 126 of the circuit 122. The signal in FIG. 5f is the count signal present on the output of the counter 116 which is supplied to the latch circuit 132.

FIGS. 6a–6f show the signals present on the same locations in the apparatus of FIG. 4, when the apparatus is switched into the SD recording mode. FIGS. 7a–7f show the signals present on the same locations in the apparatus of FIG. 4, when the apparatus is switched into the SD/2 recording mode.

Figure 8:
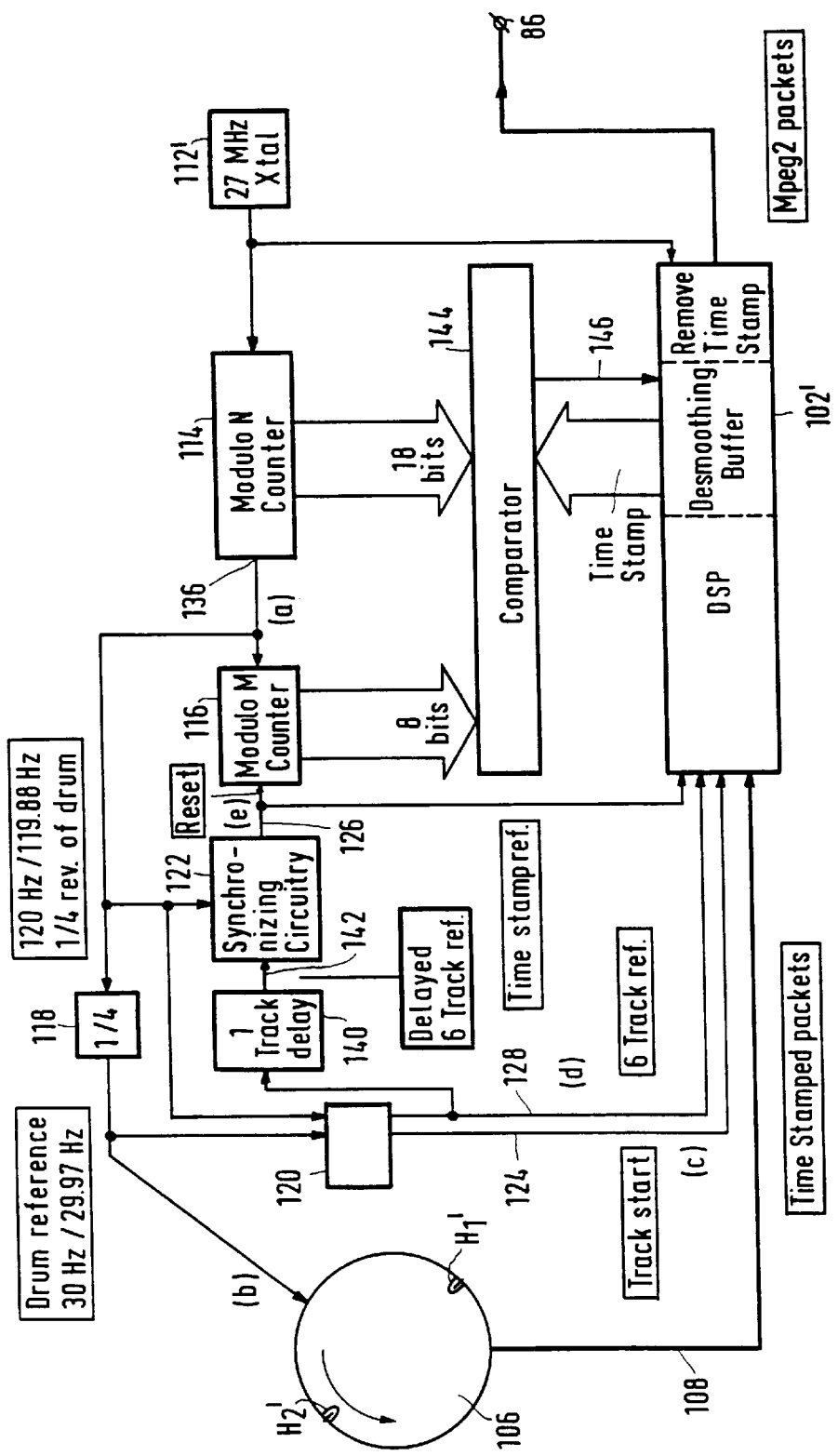
FIG. 8 shows a more elaborated embodiment of the reproducing apparatus.

FIG. 8 shows a more elaborated embodiment of the reproducing apparatus in accordance with the invention. The reproducing apparatus shows much resemblance with the recording apparatus of FIG. 4. The processed signal comprising the time-stamped packets are read from the record carrier by means of a read head pair $H_1'$ and a read head pair $H_2'$, located on the rotating head drum 106, and are supplied via the signal lead 108 to the processing circuit 112'. Signal processing is carried out on the time-stamped packets, such as a channel decoding, buffering and desmoothing, in the processing unit 102. The time stamps are removed from the packets and the packets are supplied to the output terminal 86 in dependence on the time stamps.

An oscillator circuit 112' is present and supplies a oscillation frequency of 27 MHz. The oscillator circuit 112' supplies a clock signal to a modulo-N counter 114. As has been explained above, for a 625 lines/50 Hz system, N equals 225000 and the rotational velocity of the head drum 106 is 1800 rpm. For a 525 lines/60 Hz system, N equals 225225 and the rotational velocity is 1800/1.001 rpm. The counter 114 supplies 18 bits for a count value. A modulo-M counter 116 is present which supplies 8 additional bits for the count value. M has the same value, dependent on the mode of operation, as explained above. The 22-bit count value generated by the counters 114 and 1126 is supplied to a comparator 144. The comparator 144 further receives the time stamp retrieved from the time-stamped packets, from the processing circuit 102'. Upon coincidence of a time stamp value with a count value, a coincidence signal is generated on the line 146 by the comparator 144. The packet that comprised the time stamp for which a coincidence was established, is supplied to the output terminal 86 in response to the coincidence signal.

A divide-by-4 frequency divider 118 is present so as to obtain the drum reference clock signal to control the rotational velocity of the head drum 106. For N=225000, the rotational velocity is 30 Hz (or 1800 rpm, as explained above). For N=225225, the rotational velocity is 29.97 Hz (or 1800/1.001 rpm, as explained above).

Some additional circuitry is present, given by the blocks 120, 122 and 140 for generating a track start signal, present on the line 124, a reset signal on the line 126, a 6-track reference signal on the line 128 and a 1 track delayed 6-track reference signal on the line 142.

Various signals present in the apparatus of FIG. 8 are given in FIGS. 9a–9f. FIGS. 9a–9f show signals present in the apparatus, if the apparatus is in the HD reproduction mode of operation. The signal in FIG. 9a is the signal present at the output 136 of the counter 114, which is also the count signal which is supplied to the comparator circuit 144. The signal in FIG. 9b is the signal present at the output of the divider 118. The signal in FIG. 9c is the signal present on the line 124 of the circuit 120. The signal in FIG. 9d is the signal present on the line 128 of the circuit 120. The signal in FIG. 9e is the signal present on the output line 126 of the circuit 122. The signal in FIG. 9f is the count signal present on the output of the counter 116 which is supplied to the comparator circuit 144.

FIGS. 10a–10f show the signals present on the same locations in the apparatus of FIG. 8, when the apparatus is switched into the SD reproduction mode. FIGS. 11a–11f show the signals present on the same locations in the apparatus of FIG. 8, when the apparatus is switched into the SD/2 reproduction mode.

What is claimed is:

1. Recording apparatus for recording an information signal in at least one track on a record carrier, the information signal comprising packets that may occur irregularly as a function of time in a serial datastream of the information signal, the apparatus comprising:

an input terminal for receiving the information signal;

channel encoding means for channel encoding the information signal into a channel-encoded information signal; and writing means for writing the channel-encoded information signal in said at least one track on the record carrier, the channel-encoded information signal comprising frames of information being recorded in said at least one track, characterized in that the apparatus further comprises:

time stamp generator means for generating time stamps having a relation to the moment of occurrence of a packet comprised in the information signal received; and combining means for combining a packet and its corresponding time stamp so as to obtain a composite packet, the time stamp generator means comprising counter means adapted to generate subsequent cycles of subsequent count values, said cycles coinciding in time with the recording of subsequent frames of information in the at least one track on the record carrier, the time stamp generator means being adapted to generate, in response to the detection of the occurrence of a packet in said information signal, a time stamp for said packet, said time stamp having a specified relationship to the count value of said counter means at said moment of occurrence of said packet.

2. Recording method for recording an information signal in at least one track on a record carrier, said recording method to be carried out in the recording apparatus as claimed in claim 1.

3. Recording apparatus as claimed in claim 1, characterized in that the time stamp generator means comprises oscillator means for providing a clock signal for the counter means, the counter means being adapted to count through subsequent count values in response to said clock signal.

4. Recording apparatus as claimed in claim 3, characterized in that the oscillator means is adapted to provide a clock signal having a clock frequency of 27 MHz.

5. Recording apparatus as claimed in claim 3, characterized in that the time stamp generator means further comprises resetting means for resetting the counter means to a start count value, upon the start of recording of a frame of information.

6. Recording apparatus as claimed in claim 1, characterized in that said specified relationship is such that the time stamp and the count value are equal to each other.

7. Recording apparatus as claimed in claim 1, characterized in that the packets are MPEG information packets that satisfy the MPEG datastream format.

8. Record carrier obtained by the recording apparatus as claimed in claim 1, said record carrier having an information signal recorded thereon in at least one track on said record carrier in channel-encoded form, the channel-encoded information signal comprising frames of information having been recorded in said at least one track, a plurality of packets comprised in the information signal having been stored in a frame together with a time stamp for each of the packets, in the form of a composite packets, for each of the plurality of packets, the time stamp in a packet having a specified relationship to a count value in a cycle of subsequent count values from a start value to a final value, said cycle coinciding in time with a time interval required for recording a frame of information on said record carrier.

9. Recording apparatus of the helical scan type, for recording an information signal in slant tracks on a record carrier, the information signal comprising packets that may occur irregularly as a function of time in the serial datastream of the information signal, the recording apparatus comprising:

an input terminal for receiving the information signal;

channel encoding means for channel encoding the information signal into a channel-encoded information signal; and writing means for writing the channel-encoded information signal in said tracks on the record carrier, the channel-encoded information signal comprising frames of information, a frame of information being recorded in a group of n subsequent tracks, where n is an integer larger than 1, characterized in that the recording apparatus further comprises:

time stamp generator means for generating time stamps having a relation to the moment of occurrence of a packet comprised in the information signal received; and combining means for combining a packet and its corresponding time stamp so as to obtain a composite packet, the time stamp generator means comprising counter means adapted to generate subsequent cycles of subsequent count values, said cycles coinciding in time with the recording of subsequent groups of n subsequent tracks on the record carrier, the time stamp generator means being adapted to generate, in response to the detection of the occurrence of a packet in said information signal, a time stamp for said packet, said time stamp having a specified relationship to the count value of said counter means at said moment of occurrence of said packet.

10. Recording apparatus as claimed in claim 9, characterized in that the time stamp generator means comprises oscillator means for providing a clock signal for the counter means, the counter means being adapted to count through subsequent count values in response to said clock signal.

11. Recording apparatus as claimed in claim 10, characterized in that the oscillator means is adapted to provide a clock signal having a clock frequency of 27 MHz.

12. Recording apparatus as claimed in claim 10, characterized in that the time stamp generator means further comprises resetting means for resetting the counter means to a start count value, upon the start of recording of a frame of information.

13. Recording apparatus as claimed in claim 9, characterized in that said specified relationship is such that the time stamp and the count value are equal to each other.

14. Recording apparatus as claimed in claim 9, characterized in that the packets are MPEG information packets that satisfy the MPEG datastream format.

15. Record carrier obtained by the recording apparatus as claimed in claim 9, said record carrier having an information signal recorded thereon in at least one track on said record carrier in channel-encoded form, the channel-encoded information signal comprising frames of information having been recorded in said at least one track, a plurality of packets comprised in the information signal having been stored in a frame together with a time stamp for each of the packets, in the form of a composite packets, for each of the plurality of packets, the time stamp in a packet having a specified relationship to a count value in a cycle of subsequent count values from a start value to a final value, said cycle coinciding in time with a time interval required for recording a frame of information on said record carrier.

16. Reproducing apparatus for reproducing an information signal that has been recorded, in channel-encoded form, in at least one track on a record carrier, the information signal comprising packets that may occur irregularly as a function of time in a serial datastream of the information signal, a frame of the channel-encoded information signal having been recorded in said at least one track, the reproducing apparatus comprising:

reading means for reading the channel-encoded information signal from said at least one track;

channel decoding means for channel decoding the channel-encoded information signal into a replica of the information signal; and an output terminal for supplying the replica of the information signal, characterized in that the frames in the channel-encoded information signal reproduced from the record carrier comprise composite packets, said composite packets being the packets comprised in the information signal, time stamps having been added to the packets so as to form said composite packets, said time stamps having a relation to the moment of occurrence of a packet comprised in the information signal upon recording, the channel decoding means comprising:

time stamp retrieval means for retrieving the time stamp from a composite packet so as to obtain the packet and the time stamp corresponding to said packet;

counter means adapted to generate subsequent cycles of subsequent count values from a start value to a final value, said cycles coinciding in time with the reproduction of the frames from said at least one track; and output means for comparing, for each packet, the corresponding time stamp with the count value of the counter means, and for supplying the packet to the output terminal at a time instant when the count value of the counter means and the time stamp have a specified relationship to each other.

17. Reproducing apparatus as claimed in claim 16, characterized in that the reproducing apparatus comprises oscillator means for providing a clock signal for the counter means, the counter means being adapted to count through subsequent count values in response to said clock signal.

18. Reproducing apparatus as claimed in claim 17, characterized in that the oscillator means is adapted to provide a clock signal having a clock frequency of 27 MHz.

19. Reproducing apparatus as claimed in claim 18, characterized in that the time stamp generator means further comprises resetting means for resetting the counter means to said start value, upon the start of reproducing of a frame from said at least one track.

20. Reproducing apparatus as claimed in claim 19, characterized in that the resetting means comprises synchronization means for detecting the start of frames in said reproduced channel-encoded information signal, the synchronization means being adapted to generate a reset signal for resetting said counter means.

21. Reproducing apparatus as claimed in claim 16, characterized in that said specified relationship is such that the time stamp and the count value are equal to each other.

22. Reproducing apparatus as claimed in claim 21, characterized in that the packets are MPEG information packets that satisfy the MPEG datastream format.

23. Reproducing apparatus of the helical scan type, for reproducing an information signal that has been recorded, in channel-encoded form, in slant tracks on a record carrier, the information signal comprising packets that may occur irregularly as a function of time in a serial datastream of the information signal, a frame of the channel-encoded information signal having been recorded in a groups of n subsequent tracks, where n is an integer larger than 1, the reproducing apparatus comprising:

reading means for reading the channel-encoded information signal from the tracks;

channel decoding means for channel decoding the channel-encoded information signal into a replica of the information signal; and an output terminal for supplying the replica of the information signal, characterized in that the frames in the channel-encoded information signal reproduced from the record carrier comprise composite packets, said composite packets being the packets comprised in the information signal, time stamps having been added to the packets so as to form said composite packets, said time stamps having a relation to the moment of occurrence of a packet comprised in the information signal upon recording, the channel decoding means comprising:

time stamp retrieval means for retrieving the time stamp from a composite packet so as to obtain the packet and the time stamp corresponding to said packet;

counter means adapted to generate subsequent cycles of subsequent count values from a start value to a final value, said cycles coinciding in time with the reproduction of subsequent groups of n subsequent tracks; and output means for comparing, for each packet, the corresponding time stamp with the count value of the counter means, and for supplying the packet to the output terminal at a time instant when the count value of the counter means and the time stamp have a specified relationship to each other.

24. Reproducing apparatus as claimed in claim 23, characterized in that the reproducing apparatus comprises oscillator means for providing a clock signal for the counter means, the counter means being adapted to count through subsequent count values in response to said clock signal.

25. Reproducing apparatus as claimed in claim 24, characterized in that the oscillator means is adapted to provide a clock signal having a clock frequency of 27 MHz.

26. Reproducing apparatus as claimed in claim 25, characterized in that the time stamp generator means further comprises resetting means for resetting the counter means to said start value, upon the start of reproducing a frame from said at least one track.

27. Reproducing apparatus as claimed in claim 26, characterized in that the resetting means comprises synchronization means for detecting the start of frames in said reproduced channel-encoded information signal, the synchronization means being adapted to generate a reset signal for resetting said counter means.

28. Reproducing apparatus as claimed in claim 23, characterized in that said specified relationship is such that the time stamp and the count value are equal to each other.

29. Reproducing apparatus as claimed in claim 28, characterized in that the packets are MPEG information packets that satisfy the MPEG datastream format.

* * * * *

UNITED STATES PATENT AND TRADEMARK OFFICE
CERTIFICATE OF CORRECTION

PATENT NO.   : 5,953,483                                              Page 1 of 1
DATED        : September 14, 1999
INVENTOR(S)  : Wilhelmus J. Van Gestel, Ronald W.J.J. Saeijs, Fre J. Jorritsma and Onno Eerenberg It is certified that error appears in the above-identified patent and that said Letters Patent is hereby corrected as shown below:

<u>Column 13,</u>
Line 5, change "packets" to -- packet --.

<u>Column 14,</u>
Line 6, change "packets" to -- packet --.

Signed and Sealed this

Twenty-ninth Day of October, 2002

Attest:

Attesting Officer

JAMES E. ROGAN
Director of the United States Patent and Trademark Office